United States Patent
Laymon

(10) Patent No.: US 8,662,374 B2
(45) Date of Patent: Mar. 4, 2014

(54) METHOD FOR REDUCED CYCLE TIMES IN MULTI-PASS WELDING WHILE PROVIDING AN INERT ATMOSPHERE TO THE WELDING ZONE

(75) Inventor: Scott Laymon, Kingston, GA (US)

(73) Assignee: Air Liquide Industrial U.S. LP, Houston, TX (US)

( * ) Notice: Subject to any disclaimer, the term of this patent is extended or adjusted under 35 U.S.C. 154(b) by 430 days.

(21) Appl. No.: 12/970,171

(22) Filed: Dec. 16, 2010

(65) Prior Publication Data
US 2012/0152398 A1 Jun. 21, 2012

(51) Int. Cl.
B23K 31/02 (2006.01)

(52) U.S. Cl.
USPC ............ 228/102; 228/103; 228/200; 228/219

(58) Field of Classification Search
None
See application file for complete search history.

(56) References Cited

U.S. PATENT DOCUMENTS

| | | | | |
|---|---|---|---|---|
| 2,795,689 | A * | 6/1957 | McNutt | 219/60 R |
| 3,002,191 | A * | 9/1961 | Thielsch | 228/168 |
| 3,621,177 | A * | 11/1971 | McPherson et al. | 219/51 |
| 3,948,428 | A | 4/1976 | Bonomo et al. | |
| 4,071,732 | A * | 1/1978 | Tanaka et al. | 219/137 R |
| 4,101,067 | A * | 7/1978 | Sloan et al. | 228/222 |
| 4,152,568 | A * | 5/1979 | Yamaguchi et al. | 219/61.7 |
| 4,153,831 | A * | 5/1979 | Renzulli et al. | 219/121.36 |
| 4,200,782 | A | 4/1980 | Kuzmak et al. | |
| 4,213,555 | A * | 7/1980 | Minkiewicz et al. | 228/29 |
| 4,218,604 | A | 8/1980 | Masaoka et al. | |
| 4,223,197 | A | 9/1980 | Imai et al. | |
| 4,347,421 | A * | 8/1982 | Mukuda et al. | 219/60 A |
| 4,371,775 | A * | 2/1983 | Mihara et al. | 219/121.46 |
| 4,387,845 | A | 6/1983 | Mefferd | |
| 4,723,064 | A * | 2/1988 | Bothe, II | 219/121.84 |
| 4,757,935 | A | 7/1988 | Gügel et al. | |
| 5,204,505 | A | 4/1993 | Prange et al. | |
| 5,299,731 | A * | 4/1994 | Liyanage et al. | 228/219 |
| 5,440,090 | A * | 8/1995 | Davis et al. | 219/61 |
| 5,441,196 | A | 8/1995 | Heinakari et al. | |
| 5,577,658 | A | 11/1996 | Bailey et al. | |
| 5,639,012 | A | 6/1997 | Urech | |
| 5,902,497 | A * | 5/1999 | Alber et al. | 219/121.63 |
| 6,380,505 | B1 * | 4/2002 | Stoops et al. | 219/60 A |
| 7,032,809 | B1 | 4/2006 | Hopkins | |

(Continued)

FOREIGN PATENT DOCUMENTS

| | | |
|---|---|---|
| GB | 794 886 | 5/1955 |
| JP | 2 151 004 | 6/1990 |
| WO | WO 2007 144673 | 12/2007 |

OTHER PUBLICATIONS

Armentani, E. et al., "The effect of thermal properties and weld efficiency on residual strresses in welding," Journal of Achievements in materials and Manufacturing Engineering, vol. 20, issues 1-2, Jan.-Feb. 2007, pp. 319-322.

(Continued)

Primary Examiner — Kiley Stoner
(74) Attorney, Agent, or Firm — Allen E. White

(57) ABSTRACT

This disclosure describes a method and apparatus for controlling the temperature of a welding zone for welding together pipe sections. The temperature is controlled by a flow of inert gas through the pipes. The inert gas flow is cooled and acts as a heat sink to remove heat from the weld zone thereby controlling the weld zone temperature.

8 Claims, 1 Drawing Sheet

(56) References Cited

U.S. PATENT DOCUMENTS

| | | | |
|---|---|---|---|
| 7,282,663 | B2 | 10/2007 | Alford et al. |
| 7,520,538 | B2 | 4/2009 | McGushion |
| 2002/0038815 | A1 | 4/2002 | Yamaguchi et al. |
| 2002/0162878 | A1 | 11/2002 | Costa et al. |
| 2004/0009042 | A1* | 1/2004 | Belloni et al. ............... 405/170 |
| 2005/0252911 | A1* | 11/2005 | Regan ........................ 219/607 |
| 2006/0065071 | A1 | 3/2006 | Fleischanderl et al. |
| 2006/0266806 | A1 | 11/2006 | Yamamoto et al. |
| 2007/0119829 | A1* | 5/2007 | Vietz et al. ............... 219/121.63 |
| 2007/0292630 | A1* | 12/2007 | Gabzdyl et al. ............. 427/569 |
| 2008/0164299 | A1 | 7/2008 | Pariseau et al. |
| 2009/0065489 | A1* | 3/2009 | Duffy ....................... 219/137 R |
| 2009/0212024 | A1 | 8/2009 | Müller et al. |
| 2009/0224530 | A1* | 9/2009 | Sessions ....................... 285/31 |
| 2010/0170934 | A1 | 7/2010 | Komlos et al. |

OTHER PUBLICATIONS

Barsoum, Z. et al., "Residual stress analysis and fatigue of multi-pass welded tubular structures," Engineering Failure Analysis 15 (2008), p. 863-874.

Dong, Z.B. at al., "Three dimensional modeling weld solidification cracks in multipass welding," Theoretical and Applied Fracture Mechanics 46 (2000), pp. 156-165.

Estefen, S.F. et al., "Surface residual stress evaluation in double-electrode butt welded steel plates," Materials and Design xxx (2009), pp. xxx-xxx.

Jiang, W. et al., "Influence of cooling rate on predicted weld residual stress buildup in a thick-walled piping intersection," Journal of Pressure Vessel Technology, Apr. 2010, vol. 132, pp. 021205-1-021205-8.

Murugan, S. at al., "Temperature distribution during rnultipass welding of plates," International Journal of Pressure Vessels and Piping 75 (1998), pp. 891-905.

Sattari-Far, I. et al., "Effect of the weld groove shape and pass number on residual stresses in butt-welded pipes," International Journal of Pressure Vessels and Piping 86 (2009), pp. 723-731.

Toyoda, M. et al., "Control of mechanical properties in structural steel welds by numerical simulation of coupling among temperature, microstructure, and macro-mechanics," Science and Technology of Advanced materials 5 (2004), pp. 255-266.

Ueda, Y. et al., "Improvement of residual stresses of circumferential joint of pipe by heat-sink welding," Journal of Pressure Vessel Technology, Feb. 1, 1986, vol. 108, Issue 1, pp. 14-23, abstract only.

* cited by examiner

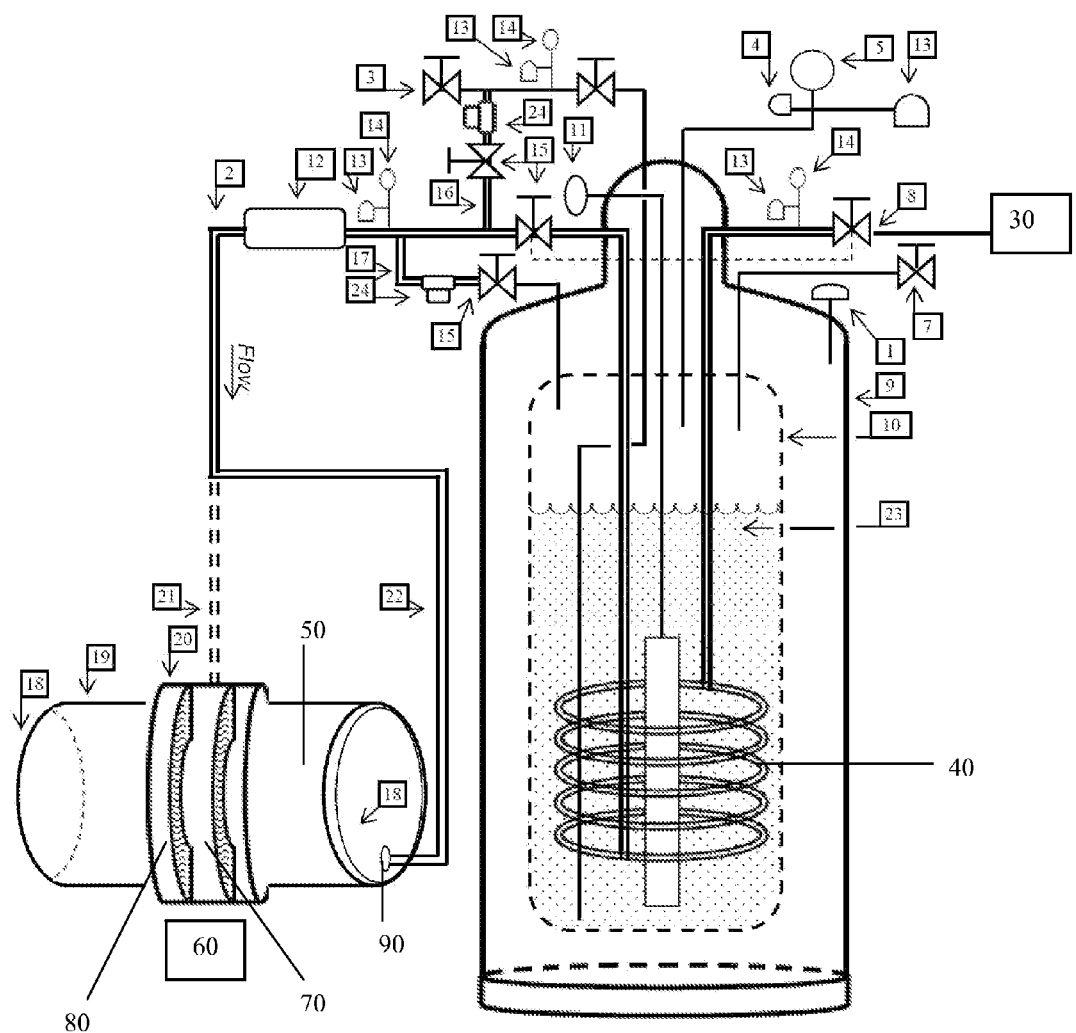

METHOD FOR REDUCED CYCLE TIMES IN MULTI-PASS WELDING WHILE PROVIDING AN INERT ATMOSPHERE TO THE WELDING ZONE

CROSS-REFERENCE TO RELATED APPLICATIONS

N/A

STATEMENT REGARDING FEDERALLY SPONSORED RESEARCH OR DEVELOPMENT

N/A

THE NAMES OF THE PARTIES TO A JOINT RESEARCH AGREEMENT

N/A

INCORPORATION-BY-REFERENCE OF MATERIAL SUBMITTED ON A COMPACT DISC

N/A

BACKGROUND OF THE INVENTION

1. Field of the Invention

The subject matter of this disclosure relates to the electrical heating of metal cylinders to form a seam bond and applying a means of cooling to the metal cylinders corresponding at least in part to U.S. Classification 261/61.7 and IPC8 B23K9/02.

2. Description of Related Art

Industrial pipe systems involve multiple pipe configurations, different diameters and pipe wall thicknesses often joined to one of numerous connection elements such as flanges, elbows, T junctions. Engineers draft spool drawings as representations of a pipe section that needs to be created. These drawings detail the angles, fitting sizes, and other specifications needed to create the desired pipe structures (fabricated pieces). The pipe assembly process generally begins with preparing the segments. Bevels are created on the pipe ends to lay down the multiple weld passes, and other pipe end or surface preparations are performed. Next the spool components are generally tack welded together to align the pipe sections for multi-pass welding.

Multi-pass welding is traditionally performed manually by specialized and highly skilled welders. However, various forms of automation exist. A common automation is flat-position groove welding. In flat-position groove welding, two or more pipe sections are set horizontally on a support structure. The support structure rotates the pipes for welding. A fixed welding torch is aligned with the pipe junction and the pipes sections are welded together while the pipes are rotating. Automated welding can include a fixed or stationary pipe, with the automated welding torch rotating around the pipe as it welds. Other forms of semi-automation include manual weld first passes with orbital GTAW or orbital FCAW for subsequent weld passes. Finally, multi-pass welding may be performed by robotic arms programmed to apply welds according to the specifications of the spools.

It is common that welding codes and or procedures limit the process to a maximum interpass temperature during the entire multi pass weld. The process of multi-pass arc welding generally involves the steps of a) creating a first weld seal (root pass) of two sections of pipe, b) allowing the weld to cool, c) performing a subsequent weld over the previous weld, and d) repeating steps b) and c) until the piping sections are fully welded together across the thickness of the pipe wall, including weld reinforcement. Many codes or weld procedures require the weld area on the inside of the pipe to be free from atmospheric contaminants such as oxygen and sometimes nitrogen. In order to accomplish this, dams are inserted into the two sections of pipe while performing welding. These dams form a contained interior volume of piping with the weld seam generally in the center. In many circumstances, both water and oxygen should be minimized or eliminated while the weld is being made and during the post welding cool down period. Consequently, during arc welding of thick walled pipe sections together, an inert gas is continually flushed through the contained interior volume to prevent oxidation of the weld site and to evaporate and remove moisture from the weld site.

A major materials issue with multi-pass welding of pipes is the structural integrality of the resulting weld. It is critical in e.g. nuclear reactors, that pipes handling reactor coolant not fail due to rupture. A stress fracture of key pipes in a refinery could result in catastrophic failure causing great damage and endangering many lives. It is thus essential that these welded structures adequately withstand the extreme conditions to which they are exposed.

A variety of standards exist which quantify various material requirements for multi-pass welded pipes. See, e.g., Process Piping: The Complete Guide to ASME B31.3. Third Edition. Charles Becht IV. ASME Press, Three Park Avenue, New York, N.Y. 10016-5990. 2009; ISBN-13: 978-0-7918-0286-1. A key control parameter in producing multi-pass welded pipes is the "interpass temperature" parameter. There are empirically defined minimum and maximum interpass temperatures depending on such factors as the type of metal alloy making up the pipe sections. These temperatures define welding process conditions that produce pipe welds with acceptable material properties. In particular, before a subsequent welding pass, the weld site temperature should be at or below the maximum interpass temperature. In practice this requires waiting for the prior weld's temperature to drop to at least the interpass maximum temperature. The interval time between weld passes in the current practice will vary according to wall thickness and maximum interpass temperature but can range from a few minutes to an hour or more. This slows down the welding process and causes undesirable idle time for highly skilled specialty welders. There is also an ongoing risk of overheating the weld zone thereby causing structural flaws in the piping produced. A severe example of such structural flaws from overheating of a metal during welding is warping and distortion of the physical shape of the material.

It is therefore desirable to effect control over the temperature of weld sites in multi-pass welding to reduce or eliminate the down time between welding passes. The art has not effectively addressed this problem. Solutions to interpass temperature control generally relate to accelerated cooling between passes. These prior art operate by application of air and/or water for convective heat transfer from the weld. Use of air exposes the weld to oxygen and is thus contraindicated for the pipe welding of this disclosure. Water cooling potentially may be used, but this requires specially adapted equipment. Exposing water to the weld site during weld processing is also undesirable because the water has to be removed after welding, the water can pose safety hazards including electrical and slip and fall, this can also lead to oxidation on the inside of the pipe.

U.S. Pat. No. 4,152,568 describes a process of coolant circulation within a pipe to accelerate the cooling rate of welds. The coolant is water, liquid nitrogen or dry ice. Liquid nitrogen is preferred for cooling from the maximum interpass temperature to 800 degrees C. U.S. Pat. No. 4,152,568 does not address multi-pass welding where three or more welds are applied in series. U.S. Pat. No. 4,152,568 does not describe the control of the maximum temperature reached by the weld site. Finally, U.S. Pat. No. 4,152,568 still requires specially adapted equipment to carry out the described accelerated interpass cooling method. This method does not address the potential for metallurgical changes in the base material as a result of deep cryogenic treatment of the weld zone and other areas where the liquid nitrogen comes in contact with the pipe. This cryogenic treatment can be advantageous by increasing wear resistance in some materials but may also be disadvantageous to some materials by possibly decreasing tensile strength and or other mechanical properties. The limitations and effects are currently being researched.

BRIEF SUMMARY OF THE INVENTION

1. A process for welding pipe sections (19) together, the process comprising the steps of:
   a) creating a first weld between the pipe sections (19) at a weld zone (70) while using an inert purge gas comprising nitrogen, argon, and/or helium at ambient temperatures,
   b) establishing an flow of an inert cooled gas through an interior (50) of the pipe sections (19) and in thermal communication with the first weld, the inert cooled gas comprising nitrogen, argon, and/or helium,
   c) monitoring a temperature of the weld zone (70),
   d) creating an additional weld between the pipe sections (19) at the weld zone (70),
   e) in response to the temperature of the weld zone (70) during step d), adjusting the temperature (12, 40) and/or a flow rate (8, 15) of the flow of the inert gas to maintain the weld junction temperature at or below a maximum interpass temperature during step d).
2. A process for welding pipe sections together, the process comprising the steps of:
   a) establishing an initial flow of an ambient temperature inert gas through an interior (50) of the pipe sections (19) and in thermal communication with the weld zone (70),
   b) creating a first weld at a weld zone (70) between the pipe sections (20),
   c) switching from ambient temperature inert gas to cooled gas (8, 15) for remaining weld passes,
   d) creating an additional weld between the pipe sections at the weld zone (70),
   e) adjusting the temperature (12, 40) and/or a flow rate of the flow of the inert gas (8,15) to reduce the maximum temperature reached during step c) at the weld zone (70).
3. The process of sentence 1 or 2, further comprising the step of adjusting the temperature (12, 40) and/or the flow rate (8, 15) of the inert gas flow to a degree sufficient to accelerate the cooling rate of the weld after the additional weld is completed, measured relative to the rate of cooling using an inert gas flow at ambient temperature at an initial flow rate.
4. The process of sentence 1, wherein the maximum interpass temperature is from 100 degrees C. to 175 degrees C. for Austenitic stainless steels and from 250 degrees C. to 315 degrees C. for various grades of carbon steels.
5. The process of sentence 1, 2, 3 or 4, wherein the temperature of the flow of inert gas is from −75 degrees C. to −226 degrees C.
6. The process of sentence 1, 2, 3, 4 or 5, wherein a flow rate of the flow of inert gas is from 10 scfh to 100 scfh.
7. The process of any one of sentences 1-6, further comprising the step of establishing a flow of an inert cooled gas onto an exterior side (20, 21, 80) of the weld zone (70) of the pipe sections (19) and in thermal communication with the weld zone (70), the inert cooled gas comprising nitrogen, argon, and/or helium.
8. The process of any one of sentences 1-7, wherein the step of establishing an flow of an inert cooled gas through an interior comprised a sub-steps of:
   i) blending cooled and ambient temperature inert gas (8, 15), and
   ii) measuring the temperature of the blended inert gas (12).
9. The process of any one of sentences 1-8 wherein the pipe sections are located on a ground outside, on a floor of a building, or are in place at the location where the finished pipe is intended to be used.
10. An apparatus specifically adapted and configured to carry out the process of any one of sentences 1-9.
11. A pipe produced by the process of any one of sentences 1-9.
12. An apparatus for controlling interpass weld temperatures during a multi-pass welding operation, the apparatus comprising,
    a) a containment barrier (18) adapted to at least partially isolate an interior volume (50) of the two or more pipe sections (19), wherein the interior volume (50) includes a part of a weld zone (70),
    b) an inert gas delivery sub-apparatus comprising,
       i) an inlet (90) fluidly connected to the volume (50) and fluidly connected to an inert gas delivery line (2, 22),
       ii) the inert gas delivery line (2, 22) further fluidly connected to a source of inert gas (30),
       iii) an inert gas flow control device (8, 15) configured to control the flow of inert gas from the inert gas source (30) into the interior volume (50),
    c) a temperature control device (12, 40) configured to be capable of adjusting the temperature of an inert gas at one or more places in the inert gas delivery sub-apparatus.
13. The apparatus of sentence 12, wherein a) the source of inert gas (30) comprises a pressurized tank comprising a liquefied inert gas stock (23) and b) the temperature control device comprises a liquefied gas vaporizer (12), the vaporizer being
    a) in fluid communication with the inert gas source (30) and the inert gas delivery line (2, 22),
    b) configured to receive the liquefied inert gas stock (23), and
    c) configured to vaporize the liquefied inert gas into a gaseous state.
14. The apparatus of sentence 12, wherein a) the source of inert gas (30) comprises a pressurized tank comprising a gaseous inert gas stock and b) the temperature control device comprises a cooling coil (40) at least partially submerged, including completely submerged, in a volume of a liquid cryogen (23).
15. The apparatus of sentences 12, 13 or 14, further comprising a temperature probe (60) configured to be capable of measuring the temperature of a weld junction a) between welding passes, b) during welding, or c) both.

16. The apparatus of sentence 12, 13, 14 or 15 further comprising a computer in operable communication with one or more component of the apparatus, the computer specifically programmed to operate the component in response to one or more of:
   a) an instruction from an operator,
   b) a value derived from a temperature probe (60) and/or an inline temperature sensor.

17. The apparatus of sentence 12, 13, 14, 15 or 16 further comprising a support scaffold adapted to position two or more pipe sections (19) in an alignment suitable for welding the pipe sections (19) together.

18. An apparatus for controlling interpass weld temperatures during a multi-pass welding operation, the apparatus comprising,
   a) a means for positioning two or more pipe sections in an alignment suitable for welding the pipe sections together (19),
   b) a means for at least partially isolating an interior volume of the two or more pipe sections (50), wherein the interior volume includes a weld zone (70),
   c) a means for providing a flow of inert gas through the interior volume (2, 8, 18, 22), and
   d) a means for adjusting the temperature of the flow of the inert gas (12, 40).

19. The apparatus of sentence 18 further comprising means for measuring the temperature (60) of a weld zone (70) a) between welding passes, b) during welding, or c) both.

BRIEF DESCRIPTION OF THE SEVERAL VIEWS OF THE DRAWING(S)

FIG. 1 shows an exemplary apparatus and method of implementing the invention using the same.

DETAILED DESCRIPTION OF THE INVENTION

Regardless of the general process of multi-pass welding, interpass temperature values should be constrained to produce welds with the required physical properties, and in some cases, the weld area must be free from oxygen and sometimes nitrogen as well. The devices and methods described herein provide a readily adopted way of controlling interpass temperatures in a multi-weld process while at the same time, providing an inert atmosphere in the weld area. The inert atmosphere will be free from oxygen and/or nitrogen depending on the cooling medium chosen. While some codes or weld procedure specifications will allow the use of nitrogen as the inerting gas, some companies or quality administrators simply prefer the use of a completely inert gas such as argon as it can provide a cleaner, more aesthetically pleasing surface on the weld root pass and heat affected zone.

An exemplary apparatus for controlling interpass weld temperatures during a multi-pass welding operation includes a) a support scaffold b) a containment barrier, c) an inert gas delivery sub-apparatus and d) a temperature control device.

Support Scaffold

The support scaffold, vice, jack stand or other similar device holds the pipe sections in alignment with each other and/or the welding torch. For example, flat-position groove welding generally uses rollers to both support and rotate the pipe sections. Other fabrication pieces have to be welded in place and can not be rotated. On site assembly of fabrication pieces in particular is often done manually on stationary fabrication pieces to form the pipe structure where the pipe will be used. The support scaffold in this context may be the same structures that will hold the final pipe in place in the final structure. Alternatively, the pipe sections may be placed on the floor or the ground outside and manually welded.

Containment Barrier

There are various types and designs of "purge dams" or containment barriers readily available in the market to date, or often the purge dams are made on site by the welders or fitters using one or more of the following or a combination of the following; tape or purge tape, cardboard, paper, wood, purge paper etc. The containments barrier forms an isolated interior pipe volume. This interior pipe volume is then flushed with an inert gas during welding. One form of containment barrier uses compression fittings to seal a hose to the end of a pipe section being welded. The hose transmits an inert purge gas from an inert gas source to the interior space of the pipes sections including the weld area. When welding larger diameter tubes, it is common to seal the hose to the tube using tape. A number of other means for forming a containments barrier are known in the art such as those disclosed in U.S. Pat. No. 4,723,064, which is incorporated herein by reference.

Inert Gas Delivery Sub-System

The Inert Gas Delivery Sub-system generally has at least three distinct elements, a source of inert gas, an inert gas delivery line (e.g. a purge hose) and an inert gas outlet.

Inert Gas Source

The source of inert gas may be any device, container or generation source of an inert gas. Examples include air separation units and industrial gas production facilities. The source of inert gas is preferably a pressurized tank holding liquefied inert gas stock such as liquid nitrogen, liquid argon, or liquid helium. The cylinder can be a standard liquid cylinder, or a liquid cylinder modified with sub-cooling coils installed. In many welding processes, the welding torch is supplied with an inert gas from an inert welding gas source. This same inert welding gas source may be used for the temperature control process described herein. In relation to industrial pipe welding for example, a common welding process used is GTAW (Tig). The GTAW process requires a supply of gaseous argon to the actual welding torch. The same argon source could be simultaneously used as a coolant gas for the process described herein.

Inert Gas Delivery Line

Each liquid cylinder generally has a gas use outlet or connection, a liquid use outlet or connection, a gas vent valve, and pressure relief devices. The liquid use line connects to the inlet side of the temperature control device, and then one end of a hose is connected to the outlet side of the temperature control device while the other end of the hose is connected to the inlet purge dam. This supplies gaseous nitrogen, argon, or helium that can range in temperature from ambient (e.g. 25 degrees C.) to −75 degrees C. to −156 degrees C. to −179 degrees C. (and any temperature sub-range or specific temperature within the forgoing range) when using either nitrogen or argon, and as cold as −212 to −226 degrees C. when using liquid helium. The inert gas delivery line structure depends in part on the inert gas source and the specific context of the welding work site. The structure may include fixed inert gas delivery pipes from industrial gas production facilities and/or standard liquefied gas dispensing hoses.

Temperature Control Device

The temperature control device may be any device capable of modifying the temperature of the inert liquid forming the inert gas flow through the contained interior volume of pipe sections. One preferred component of the temperature control device when the inert gas is derived from a liquefied gas stock is a electric heater or vaporizer attached to the liquid supply connection of a cylinder of liquid nitrogen, argon, or helium. These devices are available on the market. The vaporizer may be in fluid communication with the inert gas source and the inert gas delivery line such that the vaporizer receives the liquefied inert gas stock and vaporizes the liquefied inert gas into a gaseous state.

Another component of the temperature control device in embodiments using a liquefied inert gas stock may be a cooling coil completely or at least partially submerged in a liquefied inert gas stock. A stream of gaseous nitrogen, argon, or helium is circulated through the submersed coil to produce a sub cooled gas, and then flows through the vaporizer or heater to control the temperature to the desired range, and then is supplied to the inside of the piping fabrication piece via the purge dams.

An apparatus suitable for practicing the invention herein may include a number of other components including a temperature probe to provide a continuous monitoring of the temperature of the base material at the weld zone. A temperature probe may also be inserted into the inside of the pipe to monitor the inside temperature.

Temperature Probe

Temperature probes are typically electric and are readily available in the market. Suitable infrared thermometers are also commercially available.

Automated Temperature Control

The temperature probe and temperature control device for the inert gas may be linked by a computer specifically programmed to respond to the temperature from the probe to adjust the temperature and/or flow rate of the gas to control the temperature of the weld zone.

EXAMPLE

Standard gas cylinder 30 supplies the initial ambient temperature inert gas for creating a first pass weld between the pipe sections 19 via gas delivery lines 2 and 22. This same gas cylinder is then switched by valve connections 15 and 8 to temperature control device 40. In either case (ambient or cooled), the inert gas flows through gas delivery lines 2 and 22 through containment dams 18 and into the internal space 50 of pipe sections 19. Temperature probe 60 is a laser, non-contact infrared thermometer. The temperature probe 60 is used to monitor the temperature of the weld zone 70.

After the initial weld using ambient temperature inert gas, the switch valve connections 15 and 8 are actuated manually to deliver inert gas via the temperature control device 40. The switch valve 15 may have intermediate settings whereby ambient temperature gas flows through both bypass gas delivery line 17 and temperature control device 40. The flows of ambient and cooled gas may optionally be blended by a mechanical mixer inline with gas delivery line 50. A separate temperature sensor may optionally be in communication with the gas in line 2 to measure the temperature of the inert gas being sent to the pipe sections 19. The inert cooled gas may optionally also be delivered to the exterior 80 of the pipe sections 19 at the weld zone 70 via external line 21. The external gas line may be connected to a collar 20 placed around the weld zone 70 for delivery to the weld zone 70.

The temperature control device 40 is configured to receive the inert gas (including but not limited to nitrogen) from cylinder 30 and adapted to decrease or control the temperature of the inert gas for delivery via gas delivery line 2 to the weld zone 70. In this example, the temperature control device comprises the following components:

1. Outer vessel burst disc
2. Ambient, Cooled, or Sub-Cooled gaseous Argon, Nitrogen, or Helium outlet to process
3. Liquid fill/withdraw line
4. Inner Vessel Rupture disc
5. Pressure Gauge
6. Relief valve
7. Vent line
8. Gaseous Nitrogen, Argon, or Helium inlet—to be cooled (Alternative Method-Optional)
9. Outer vessel
10. Inner vessel—containing liquid Nitrogen, Argon, Helium, or CO2
11. Floating liquid level gauge
12. In-line gas Heater/Vaporizer-temperature control device
13. Relief valve
14. Pressure Gauge
15. Manual or Automated Valve or Solenoid
16. By-pass to permit use of liquid argon, nitrogen, or heliuum contained in the cylinder, without using the sub-cooling coils
17. By-pass to permit the use of ambient temperature Nitrogen, Argon, or Helium for making initial or root pass.
18. Purge Dam
19. Fabrication Piece Example
20. External Application Device (Alternative Method-Optional)
21. Supply Line for External Application (Optional)
22. Supply Line for Internal Application
23. Liquid Nitrogen, Argon, or Helium
24. Pressure Regulator The method of cooling the inert gas in this example is to flow the ambient temperature inert gas through a cooling coil 40. The cooling coil 40 is submerged in a cryogenic liquid such as liquid nitrogen. In this example, final cooled inert gas temperature may be adjusted to anywhere between ambient temperature and the temperature and −212 degrees Celsius by blending cooled inert gas with ambient temperature inert gas (optionally through a static mixer with temperature determined by an inline temperature sensor).

An alternative embodiment used liquid cryogen and a heated vaporizer to deliver an inert gas at a specified temperature. In other alternative embodiments, the delivery pressure of the inert gas may be regulated by one of more inline pumps to control the flow rate of the inert gas in addition to the flow valves (e.g. valve 15) and the pressure derived from the inert gas source (e.g. standard cylinder 30)

One or more of the temperature probe 60, inline temperature sensor, flow valves 15, optional inert gas pressurizing pump may be operated by the welder via a computer operably connected with devices for operating these components. For example, valves 15 and 8 may have a motor configured to switch the valves to different positions. The computer may be specifically programmed to automate one or more steps of the process. For example, the ratio of ambient and cooled inert gas may be adjusted in response to temperature probe 60 to decrease the temperature of the inert gas if the weld zone 70 reaches a predetermined threshold temperature. The computer may further operate the vaporizer 12 to adjust the temperature of the inert gas flowing to delivery line 2.

The invention claimed is:

1. A process for welding pipe sections together, the process comprising the steps of:
   a) creating a first weld between the pipe sections at a weld zone while using an inert purge gas comprising nitrogen, argon, and/or helium at ambient temperatures,
   b) establishing a first flow of an inert cooled gas through an interior of the pipe sections and in thermal communication with the first weld, the inert cooled gas comprising nitrogen, argon, and/or helium,
   c) monitoring a temperature of the weld zone,
   d) creating an additional weld between the pipe sections at the weld zone,
   e) in response to the temperature of the weld zone during step d), adjusting the temperature of the inert gas to maintain the weld junction temperature at or below a maximum interpass temperature during step d),
   wherein the temperature of the inert gas is from −156 degrees C. to −212 degrees C. and wherein the pipe sections at the weld zone comprise stainless steel or carbon steel.

2. A process for welding pipe sections together, the process comprising the steps of:
   a) establishing an initial flow of an ambient temperature inert gas through an interior of the pipe sections and in thermal communication with the weld zone,
   b) creating a first weld at a weld zone between the pipe sections,
   c) switching from ambient temperature inert gas to cooled gas for remaining weld passes,
   d) creating an additional weld between the pipe sections at the weld zone,
   e) adjusting the temperature of the inert gas to reduce the maximum temperature reached during step c) at the weld zone,
   wherein the temperature of the inert gas is from −156 degrees C. to −212 degrees C. and wherein the pipe sections at the weld zone comprise Austenitic stainless steel or carbon steel.

3. The process of claim 1 or 2, further comprising the step of adjusting the temperature of the inert gas flow to a degree sufficient to accelerate the cooling rate of the weld after the additional weld is completed, measured relative to the rate of cooling using an inert gas flow at ambient temperature.

4. The process of claim 1 or 2, wherein the maximum interpass temperature is from 100 degrees C. to 175 degrees C. for Austenitic stainless steels and from 250 degrees C. to 315 degrees C. for various grades of carbon steels.

5. The process of claim 1 or 2, wherein a flow rate of the first flow of inert gas is from 10 scfh to 100 scfh.

6. The process of claim 1 or 2, further comprising the step of establishing a second flow of an inert cooled gas onto an exterior side of the weld zone of the pipe sections and in thermal communication with the weld zone, the inert cooled gas comprising nitrogen, argon, and/or helium.

7. The process of claim 1 or 2, wherein the step of establishing a first flow of an inert cooled gas through an interior comprises sub-steps of:
   a) blending cooled and ambient temperature inert gas (100), and
   b) measuring the temperature of the blended inert gas (110).

8. The process of claim 1 or 2 wherein the pipe sections are located on a ground at an outdoor worksite, on a floor of a building, or are in place at the location where the finished pipe is intended to be used.

* * * * *